United States Patent [19]

Ushihara et al.

[11] 4,401,998

[45] Aug. 30, 1983

[54] MAGNETIC FLUID RECORDING APPARATUS

[75] Inventors: Masaharu Ushihara, Hirakata; Michinori Nagahiro, Katano; Humio Yamazaki, Hirakata; Masami Nakagawa, Kadoma; Noboru Miyaji, Neyagawa; Susumu Maruno, Katano, all of Japan

[73] Assignee: Matsushita Electric Industrial Co., Ltd., Osaka, Japan

[21] Appl. No.: 330,607

[22] Filed: Dec. 14, 1981

[30] Foreign Application Priority Data

Dec. 19, 1980 [JP] Japan ........................ 55-180715

[51] Int. Cl.³ ........................ G01D 15/16

[52] U.S. Cl. ........................ 346/140 R

[58] Field of Search ........................ 346/1.1, 75, 140

[56] References Cited

U.S. PATENT DOCUMENTS 4,315,267 2/1982 Sonoda et al. ........................ 346/1.1

4,359,752 11/1982 Nakagawa et al. .

*Primary Examiner*—Donald A. Griffin

*Attorney, Agent, or Firm*—Stevens, Davis, Miller & Mosher

[57] ABSTRACT

A plurality of magnetic styli are arranged in a row for effecting a line recording. The magnetic styli are magnetized by a magnet held in contact with these styli so that a magnetic fluid attaching to the styli is protruded from each stylus to form continuous wave-like protrusions along the row of the styli. The magnetic fluid protruded from the styli is to fly or migrate as a high voltage is applied selectively between the styli and a control electrode which opposes to the styli across the recording paper, due to a Coulomb force acting on the ends of the protrusions. In consequence, a recording is made by the magnetic fluid serving as an ink on the recording paper in accordance with a recording signal. A predetermined head or height differential is preserved between the magnet and an ink tank. The magnet and the ink tank are connected to each other by means of a pipe filled with the magnetic fluid. A slight gap is formed in the connection between the pipe and the magnet. This gap, however, is completely covered and closed by the magnetic fluid attaching to the magnet so that the ambient air is prevented from coming into the pipe. A vacuum is generated in the pipe due to the aforementioned height differential to control the amount of the magnetic fluid supplied to the magnet. As the magnetic fluid is consumed progressively at the ends of the protrusions, the magnetic fluid is supplied to the protrusions from the ink tank through the pipe and the gap. In consequence, various troubles such as printing failure due to magnetic thickening of the magnetic fluid which inevitably takes place in the conventional apparatus incorporating an elongated magnet type ink supplying device, is completely eliminated to ensure a stable printing of a high quality.

6 Claims, 13 Drawing Figures

MAGNETIC FLUID RECORDING APPARATUS

BACKGROUND OF THE INVENTION

1. Field of the Invention

The present invention relates to a recording apparatus of the type in which a magnetic fluid is held and made to protrude from a single or a plurality of recording electrodes of a magnetic metal, and a Coulomb force is applied to the end of protrusion of the magnetic fluid to make the fluid fly, thereby to effect a printing on a recording surface.

2. Description of the Prior Art

The specification of U.S. Pat. No. 4,258,371 discloses a recording apparatus making use of a magnetic fluid. This recording apparatus has a plurality of magnetized styli disposed at a predetermined pitch. A magnetic fluid is deposited to each stylus to form wave-like protrusions of the magnetic fluid on the ends of the styli along the array of the styli. A high voltage is selectively applied between the styli and control electrodes opposing to the styli to apply a Coulomb force to the end of protrusion of the magnetic fluid to make the latter fly toward the recording paper thereby to effect a printing on the recording paper by the magnetic fluid serving as an ink.

The magnetic fluid is consumed as it flies successively, so that it is necessary to make up for the shortage of the magnetic fluid. To cope with this demand, Japanese Patent Laid-open Publication Nos. 100161 and 100162/1980 disclose magnetic fluid supplying devices incorporating an elongated magnet.

In general, there is a tendency that, in the magnetic fluid placed in a magnetic field as shown in FIG. 1, the magnetite in the fluid is attracted by the magnet so that the density of the magnetite becomes higher in the portion of the fluid closer to the magnet than in the portion remoter from the magnet.

In the case where the recording portion 1 of the recording apparatus is connected to a fluid tank 2 by means of an elongated magnet 3 as shown in FIG. 2, the concentrated magnetic fluid 4 around the magnet is strongly magnetized by the magnet and is pulled by a strong force to have an inertia to move upwardly as indicated by an arrow A overcoming the force of gravity. On the other hand, the portion of the magnetic fluid 4 remote from the magnet, in which the density of the magnetite is comparatively low, is magnetized by the magnet not so strongly that only a small upward force is generated. In consequence, this portion of the magnetic fluid 4 tends to move downwardly as indicated by an arrow B. As this phenomenon takes place over the entire length of the magnet 3, the magnetic fluid held by the upper portion of the magnet 3 is progressively condensed while the magnetic fluid on the lower part of the magnet is thinned gradually.

In the recording portion of the apparatus, therefore, the density of the magnetite in the magnetic fluid becomes considerably high as compared with the initial density, so that the extent of magnetization of the magnetic fluid 4 becomes higher. This causes a change in the form of protrusion of the magnetic fluid from the expected form, as well as an increase of the viscosity of the magnetic fluid. In consequence, the flying characteristics of the magnetic fluid 4 during recording are degraded, and the fluidity of the ink, i.e. magnetic fluid, is deteriorated to hinder the recording.

SUMMARY OF THE INVENTION

Under these circumstances, the present invention aims as its major object at providing a magnetic fluid recording apparatus in which the above-described problem concerning the suppy of the magnetic fluid is overcome to ensure a high quality of the recording.

Namely, an object of the invention is to prevent, in the recording head portion of a recording apparatus using a magnetic fluid as an ink, the undesirable recording failure caused by a shortage of magnetic fluid attributable to the low fluidity of the fluid as a result of local concentration of the magnetic fluid by the magnetic field.

To this end, according to the invention, there is provided a magnetic fluid recording apparatus having a single or a plurality of recording electrodes of a magnetic material disposed to oppose to a recording surface, and magnetizing means disposed in contact with the ends of the recording electrodes and adapted to magnetize the recording electrodes thereby to make a magnetic fluid applied to the recording electrodes protrude from the ends of the latter, so that the magnetic fluid is made to fly or migrate from the protruded end thereof in accordance with a picture signal to form a picture on the recording surface, wherein the apparatus further comprises a magnetic fluid storage portion provided beneath the magnetizing means and at least one supplying pipe through which the magnetic means and the magnetic fluid storage portion are connected to each other, and a slight gap is formed between one end of the supplying pipe and the magnetizing means, the gap being adapted to be completely covered, when the magnetic fluid is attached to the magnetizing means and the supplying pipe is filled with the magnetic fluid, by the magnetic fluid attaching to the magnetizing means.

DETAILED DESCRIPTION OF THE PREFERRED EMBODIMENTS

The outline of the magnetic fluid recording apparatus of the invention will be described hereinunder with reference to FIGS. 3 and 4.

Figure 1:
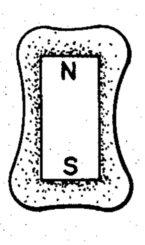
FIG. 1 is an illustration of the state of a magnetic fluid attaching to a magnet and the concentration distribution of the magnetic fluid.
Figure 3:
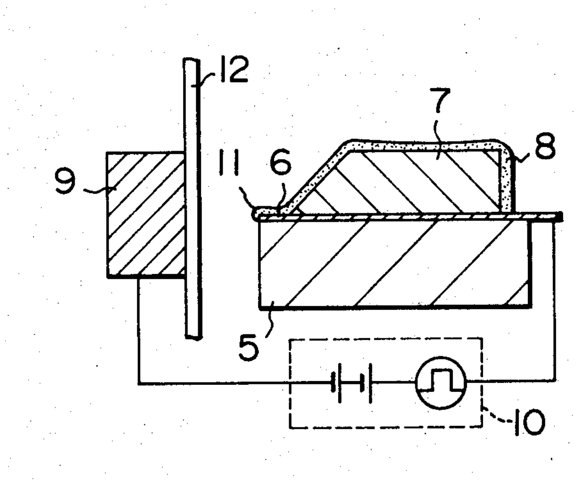
FIG. 3 is a schematic sectional side elevational view of a recording portion of the recording apparatus in accordance with the invention.
Figure 2:
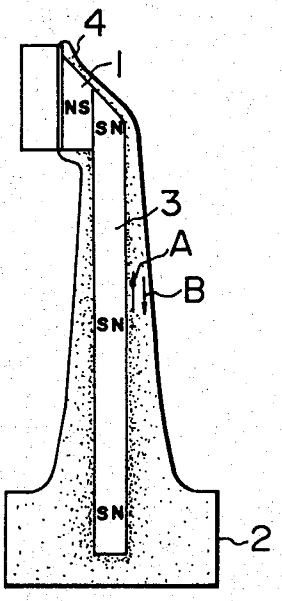
FIG. 2 is an illustration of a concentration of the magnetic fluid caused by the magnetism when the magnetic fluid is supplied by means of a magnet.
Figure 4:
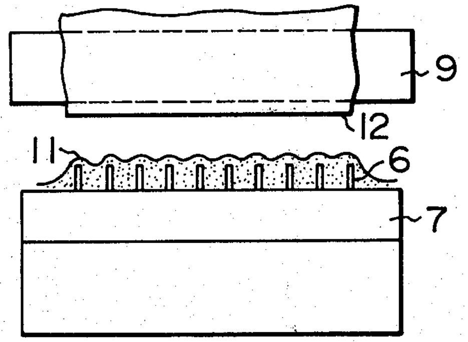
FIG. 4 is a schematic plan view of the recording portion as shown in FIG. 3.

A plurality of recording electrodes 6, only one of which is shown in the sectional view in FIG. 3, are disposed on a base plate 5. An exciting magnet 7 for magnetizing these electrodes 6 is bonded to the upper surfaces of the electrodes 6. The exciting magnet 7 and the recording electrodes 6 magnetized by the magnet 7 magnetically hold a suitable amount of magnetic fluid 8, and a series of continuous protrusions 11 of the magnetic fluid 8 is formed on the recording electrodes 6, as will be clearly seen from the front elevational view in FIG. 4. As a voltage is applied between a selected electrode 6 and a control electrode 9 by means of a voltage applying means 10, a Coulomb force is exerted on the protrusion of the magnetic fluid on the recording electrode 6 so that the end portion of the fluid protrusion is severed and is made to fly toward a recording medium 12 to effect a recording on the recording medium 12.

A magnetic fluid recording apparatus of a first embodiment of the invention will be described hereinunder with reference to FIGS. 5 and 6 which are a perspective view and a sectional side elevational view of the first embodiment. As will be seen from these Figures, a magnet 17 is disposed to oppose to the exciting magnet 7. The magnet 17 is fixed in a holder vessel 18 for holding the magnetic fluid. A slit-shaped opening 19 of a width of 0.01 to 2 mm is formed between the closer ends of the magnets 7 and 17. The space defined between two magnets 7 and 17 is diverged toward the rear ends (right-side ends as viewed in the drawings) of the magnets. At least one drain 20 is formed at the rear end of the holder vessel 18.

At least one pipe 14 is connected between the drain 20 and a storage portion 13 for storing the magnetic fluid.

On the other hand, a predetermined amount of magnetic fluid 8 is stored in the magnetic fluid storage portion 13. The level 15 of the fluid is maintained constant by means of a level controller (not shown). A booster pump 16 is disposed at an intermediate portion of the pipe 14.

The pipe 14 and the holder vessel 18 are full of the magnetic fluid 8. The magnetic fluid 8 attaches also to the exciting magnet 7 and the magnet 17 by the magnetic attracting force as illustrated. The exciting magnet 7 and the magnet 17 are disposed such that the poles of the same polarity of these two magnets oppose to each other. The magnetic lines of force emerging from the N poles of both magnets are concentrated to the opening 19 between two magnets, so that the magnetic fluid is strongly held in that opening, thereby to prevent the ambient air from coming into the holder vessel 18 in which a vacuum is maintained.

The amount of the magnetic fluid 8 attaching to the exciting magnet 7 is determined by the head H between the exciting magnet 7 and the liquid level 15, and the extent of protrusion of the magnetic fluid 8 is determined by the amount of the magnetic fluid 8 attaching to the exciting magnet 7. In order to obtain a predetermined extent of protrusion, therefore, it is necessary to optimize the head H.

The gap at the opening 19 between two magnets is preferably selected, as stated before, to range between 0.01 and 2 mm. A too large gap will reduce the concentration of the magnetic flux to the opening to increase the chance of invasion by the ambient air through this opening, while a too small gap will adversely affect the flow of magnetic fluid.

The apparatus of this embodiment having the described construction operates in a manner explained hereinunder. For filling the pipe 14 and the holder vessel 18 with the magnetic fluid 8, the pump 16 is started to suck up the magnetic fluid from the storage portion 13. The pump 16 is stopped after the magnetic fluid 8 is attached to the exciting magnet 7 in a manner shown in FIG. 6. Although the positive force for driving the magnetic fluid is extinguished as a result of the stopping of the pump 16, the air is prevented from coming into the holder vessel 18 and the pipe 14, because the magnetic fluid is strongly held around the opening 19 by the magnetic force.

As the magnetic fluid 8 is consumed as a result of a successive printing, the amount of the magnetic fluid held by the exciting magnet 7 is gradually decreased. In consequence, the balance between the force produced by the magnetic fluid attaching to the exciting magnet 7 and the force produced due to the head H is broken, so that a force is generated to recover the predetermined amount of magnetic fluid 8 attaching to the exciting magnet 7, so that the magnetic fluid 8 in the holder vessel 18 is moved onto the exciting magnet 7 without delay. This natural movement of the magnetic fluid is stopped when the predetermined amount of magnetic fluid on the magnet 7 is obtained. Since this supply of the magnetic fluid 8 is performed without permitting air coming into the holder vessel, additional supply of the magnetic fluid to the holder vessel 18 is made automatically from the storage portion 13 through the pipe 14, thereby to make up for the amount which has been transferred to the exciting magnet 7.

It is true that a concentration of the magnetite in the fluid 8 takes place on the exciting magnet in this embodiment. The concentration, however, is extremely small and negligible because of the small vertical length of the exciting magnet 7. In fact, this concentration does not substantially affect the quality of the printing.

In the described embodiment, a pump is used for filling the pipe 14 and the holder vessel 18 with the magnetic fluid. The use of the pump, however, is not exclusive and an equivalent effect can be obtained by applying a pressure onto the surface of the stored liquid or by reducing the head H through raising the liquid level 15. It is also possible to obtain an equivalent effect by supplying beforehand a large amount of magnetic fluid to the exciting magnet 7.

Thus, in the described embodiment, once the pump 16 is activated for the initial supply of the magnetic fluid, the magnetic fluid can be continuously supplied without requiring any power after stopping of the pump. The continuous supply of the magnetic fluid can be achieved by a magnetic fluid supplying device of a simple construction composed of the magnet 17, the holder vessel 18 and the pipe 14 all of which are cheap and easily obtainable. In addition, the invasion by the ambient air is prevented by the provision of the magnet 17, so that the magnetic fluid supplying device can operate stably at a high reliability.

In the embodiment described in connection with FIG. 6, two magnets 7, 17 are disposed to directly oppose to each other. In another embodiment shown in FIG. 7, shield plates 21, 22 having a high magnetic permeability are bonded to the surfaces of N poles of both magnets. In this embodiment, therefore, no magnetic line of force emerges in the space between two magnets, so that the undesirable concentration of magnetite of the magnetic fluid, which tends to occur in this space, is further suppressed to ensure a further improved quality of the recording. The shield plate may be attached to either one of the two magnets. The distance between two shield plates 21, 22 or the distance between the shield plate and the magnet opposing to the shield plate is selected to range between 0.01 and 2 mm.

Figure 5:
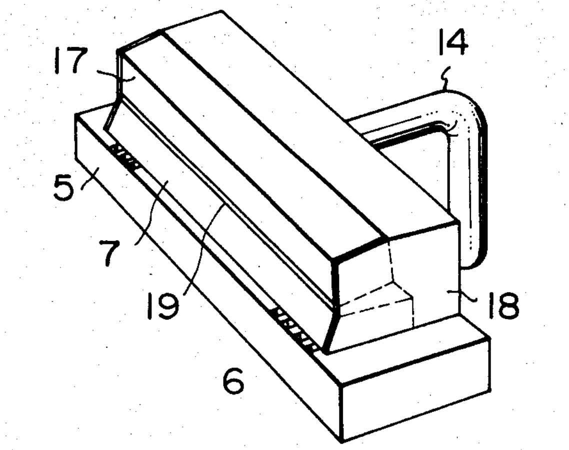
FIG. 5 is a sectional view of an essential portion of an embodiment of the invention.
Figure 7:
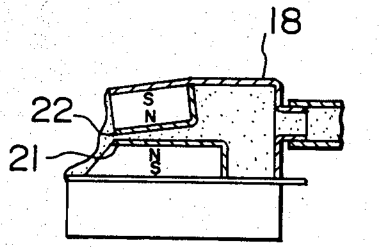
FIGS. 7 to 13 are sectional side elevational views of essential parts of different embodiments of the invention.
Figure 8:
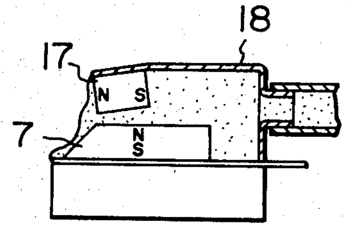

FIG. 8 shows still another embodiment in which, contrast to the embodiment shown in FIGS. 5 and 7 having two magnets arranged such that the poles of the same polarity oppose to each other, the two magnets are arranged such that the spins of magnetic poles of two magnets are perpendicular to each other. This arrangement permits a concentration of the magnetic lines of force to the opening 19 as in the case of the foregoing embodiments, thereby to ensure an equivalent sealing effect. A substantially equal effect is achieved in this case when a shield plate having a high magnetic permeability is sttached to the N pole of the exciting magnet 7. The gap of the opening 11 is selected to range between 0.01 and 2 mm also in this case.

Figure 9:
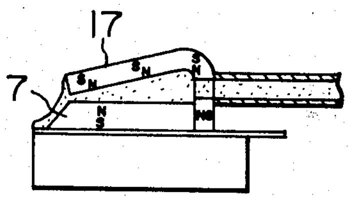

FIG. 9 shows a further embodiment having modified forms and arrangement of the magnets. Namely, in this embodiment, the form of the second magnet 17 is modified such that the exciting magnet 7 and the second magnet 17 in combination constitute the holder vessel of the magnetic fluid.

Figure 10:
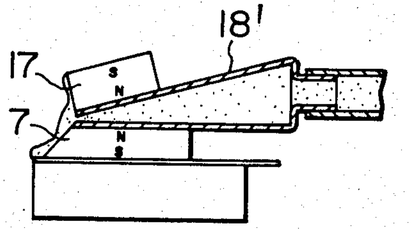

FIG. 10 shows a still further embodiment in which the holder vessel 18′ itself is provided at its end with the opening. The space in the holder vessel 18′ is diverged toward the rear side and the drain is provided at the rear side of the holder vessel 18′. The exciting magnet 7 and the second magnet 17 are attached to the outer sides of the end of the holder vessel 18′.

Figure 6:
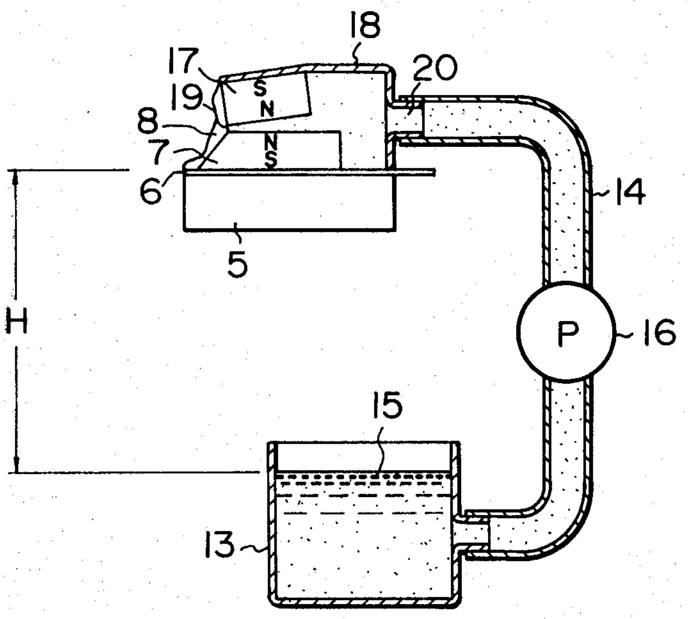
FIG. 6 is a sectional side elevational view of the embodiment shown in FIG. 7.
Figure 11:
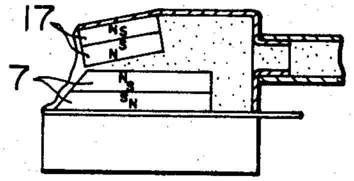

FIG. 11 shows a still further embodiment having a construction basically identical to that shown in FIGS. 5 and 6. In this case, however, each of the magnets 7 and 17 is constituted by a plurality of magnet segments.

Figure 12:
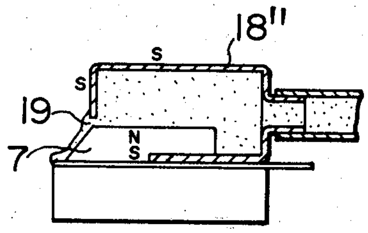
Figure 13:
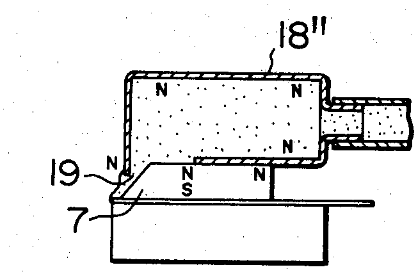

In a still further embodiment shown in FIGS. 12 and 13, the holder vessel 18″ is made of a material easy to magnetize. The distance between the end of this holder vessel 18′ and the exciting magnet 7 is made sufficiently small to form the opening 19 defined by a gap of a width of between 0.01 and 2 mm. Magnetic pole distributions as shown in FIGS. 12 and 13 are obtained depending on which one of the exciting magnet 7 is contacted by the holder vessel 18″.

It will be clear to those skilled in the art that the embodiments described in connection with FIGS. 7 to 13 provide advantages substantially same as that offerred by the embodiment shown in FIGS. 5 and 6.

In the embodiment shown in FIGS. 12 and 13, it is not essential to use an easily magnetizable material as the material of the holder vessel 18′. Namely, a substantially equivalent effect is obtained even if the holder vessel 18″ is made of a non-magnetic material, provided that the end of the holder vessel 18″ protrudes into the layer of the magnetic fluid attaching to and held by the exciting magnet 7 and that the end of the holder vessel 18′ opposes to the exciting magnet 7 with the opening 19 formed therebetween.

In the embodiments described hereinbefore, the holder vessel 18 and the drain 20 are disposed between the opening 19 and the pipe 14. It is, however, possible to arrange such that the pipe 14 itself plays the role of the holder vessel 18 and the drain 20, by increasing the diameter of the pipe 14.

In this case, an equivalent effect is obtained by arranging such that the end of the pipe 14 protrudes into the layer of the magnetic fluid attaching to and held by the exciting magnet so as to form the opening 19.

In the embodiments described heretofore, the styli are disposed to extend horizontally. This however, is not exclusive and the invention can be embodied in the form of a recording apparatus having styli directed upwardly or at an inclination.

As has been described, according to the invention, the undesirable concentration of thickening of the magnetic fluid, which takes place inevitably in the conventional recording apparatus in the supply of the magnetic fluid, is effectively avoided by a simple magnetic fluid supplying device constituted by the cheap parts such as magnets, pipe and a vessel. In addition, this magnetic fluid supplying device can continuously supply the magnetic fluid without using any specific power.

What is claimed is:

1. A magnetic fluid recording apparatus having at least one recording electrode made of a magnetic material and disposed to oppose to a recording surface, and at least one exciting magnet disposed in contact with said recording electrode and adapted to magnetize said recording electrode thereby to make a magnetic fluid attaching to said recording electrode to protrude from the latter, the protruded magnetic fluid being made to fly or migrate toward said recording surface in accordance with a picture signal thereby to form a picture on said recording surface, the improvement wherein said apparatus comprises a magnetic fluid storage portion disposed beneath said exciting magnet, and at least one pipe connected between said exciting magnet and said magnetic fluid storage portion, one end of said pipe being positioned to oppose to said exciting magnet to form a small gap therebetween, said small gap being adapted to be completely covered, when said magnetic fluid is attached to said exciting magnet and charged into said pipe, by said magnetic fluid attaching to said exciting magnet.

2. A magnetic fluid recording apparatus having at least one recording electrode made of a magnetic material and disposed to oppose to a recording surface and at least one exciting magnet disposed in contact with said recording electrode and adapted to magnetize said recording electrode thereby to make a magnetic fluid attaching to said recording electrode to protrude from the latter, the protruded magnetic fluid being made to fly or migrate toward said recording surface in accordance with a picture signal thereby to form a picture on said recording surface, wherein the improvement comprises a pair of magnetic members having magnetic poles, a slit-shaped opening defined between said mgnetic members, a magnetic fluid holding portion including said magnetic members and adapted to hold said magnetic fluid, a magnetic fluid storage portion disposed beneath said recording electrode, and at least one pipe connected between said magnetic fluid holding portion and said magnetic fluid storage portion, said opening being located in the vicinity of said exciting magnet, said opening, magnetic fluid holding portion and said pipe being filled with said magnetic fluid.

3. A magnetic fluid recording apparatus as claimed in claim 2, wherein one of said pair of magnetic members is constituted by said exciting magnet.

4. A magnetic fluid recording apparatus as claimed in either one of claims 2 and 3, wherein at least one of said pair of magnetic members has a composite structure consisting of a magnet and a member of a material having a high magnetic permeability.

5. A magnetic fluid recording apparatus as claimed in claim 2, whether at least one of said pair of magnetic members is a magnet.

6. A magnetic fluid recording apparatus as claimed in either one of claims 1 and 2, characterized by further comprising a pump disposed at an intermediate portion of said pipe.

* * * * *